No. 11,847. Reissued Aug. 14, 1900.

F. H. GILSON.

SEPARABLE BOOK.

(Application filed June 28, 1898.)

Witnesses:

A. D. Harrison

P. W. Pezzette

Inventor:

F. H. Gilson by Wright, Brown & Quinby

Attys.

UNITED STATES PATENT OFFICE.

FRANKLIN H. GILSON, OF WELLESLEY, MASSACHUSETTS, ASSIGNOR TO THE F. H. GILSON COMPANY, OF BOSTON, MASSACHUSETTS.

SEPARABLE BOOK.

SPECIFICATION forming part of Reissued Letters Patent No. 11,847, dated August 14, 1900.

Original No. 594,203, dated November 23, 1897. Application for reissue filed June 28, 1898. Serial No. 684,699.

*To all whom it may concern:*

Be it known that I, FRANKLIN H. GILSON, of Wellesley, in the county of Norfolk and State of Massachusetts, have invented certain new and useful Improvements in Separable Books, of which the following is a specification.

This invention relates to a separable book; and one of its objects is to provide an improved extensible cover for articles of this character.

The invention consists in the improvements which I shall now proceed to describe and claim.

Figure 1:
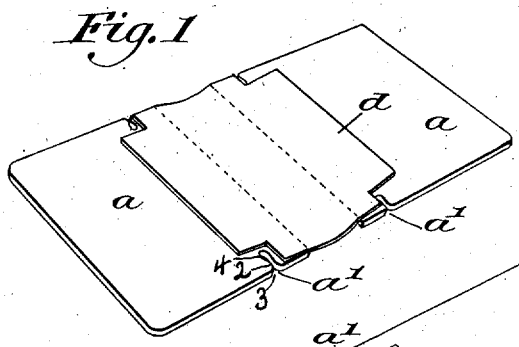
Figure 2:
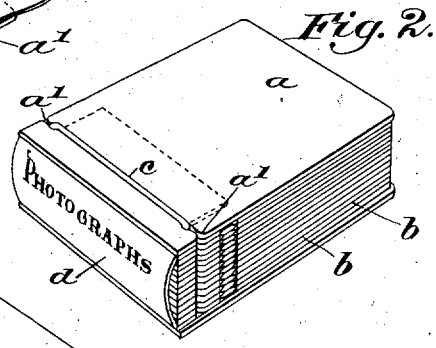
Figure 3:
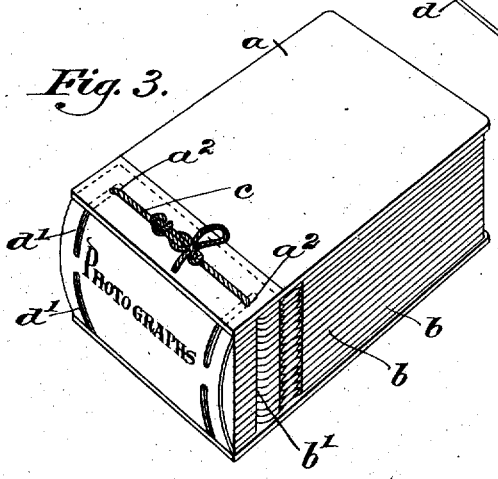
Figure 4:
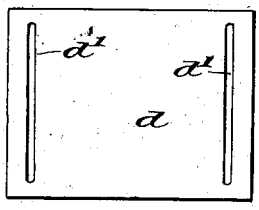

Of the accompanying drawings, forming a part of this specification, Figure 1 represents a perspective view of an album-cover embodying my invention, the cover being shown opened out and the leaves removed. Fig. 2 represents a perspective view of the album complete. Fig. 3 represents a view similar to Fig. 2 of a modified form of my invention. Fig. 4 represents a plan view of one form of back employed in my improved album.

The same letters of reference indicate the same parts in all the figures.

Referring to the drawings, *a a* represent the two lids of my improved album-cover, the same being substantially alike and constructed of any suitable material.

*b b* represent a pack of leaves inserted between the lids, the said leaves being provided with slots *b'* in their upper and lower edges near their inner ends, the slots in all the leaves being adapted to coincide. The lids are provided with similar slots *a'*, which coincide with the slots in the leaves. The slots *a'* and *b'* are "pear-shaped"—that is to say, each slot has a narrow throat 2, a flaring entrance or mouth 3, and an enlarged part or inner portion 4, whereby the fastening-cord is guided into the throat through the flaring mouth, and from thence passes into the enlarged part 4 of the slot, where it seats itself. The walls of the throat are comparatively rigid and unyielding, whereby the cord is compressed or constricted while it is passing therethrough, and hence when the latter is seated in the inner enlarged end of the slot it expands and is held against being accidentally drawn outward through the said throat. The slots extend inward toward each other from the top and bottom edges of the rear ends of the leaves and open outward, as shown.

*c* represents a binding device, which may be a continuous rubber band adapted to encircle the end of the book and engage the slots *b'* and *a'*. This construction renders it possible to quickly take the book apart and assemble it and also to quickly and easily insert a leaf or leaves or remove the same.

*d* represents a flexible back free from direct connection with the lids *a a*. The said back is composed of a single piece of flexible material and is adapted to cover the rear ends of the pack of leaves and to lie with one of its own ends underneath each lid, between the said lid and the pack of leaves.

In order to accommodate the binding-cord *c*, the back *d* may be partially cut away or recessed along its edges, as shown in Fig. 1, or it may be slotted to receive the said cord, as shown in Figs. 3 and 4, in which two different methods of slotting are illustrated.

It now becomes evident that the whole album-cover, comprising lids and back, is capable of adjustment to accommodate a greater or less number of leaves and that the size of the exposed portion of the said back *d* may be varied by simply drawing up its ends underneath each lid or by allowing the same to be withdrawn. The back is thus prevented from bulging and may easily be centralized by an endwise adjustment, so that lettering or ornamentation on the back will be symmetrically exposed.

Fig. 3 shows a construction in which the lid *a* is provided with orifices $a^2$ to receive the binding-cord *c* instead of the slots *a'*, and a discontinuous cord *c* is used having its ends tied together, instead of the rubber band before mentioned. With either the slotted back or that shown in Fig. 1 the binding-cord *c* is so arranged in relation to the said back that it engages the same and helps to maintain it in its proper position.

My invention is not confined in its application to albums, but may be applied to any other separable book of this nature, such as books for holding samples of cloth or other merchandise.

I claim—

1. A book of the character specified, comprising a cover consisting of two independent lids, and a back separate from said lids, said back and lids having their ends loosely overlapping; a series of leaves interposed between said lids and having slots extending inward from the top and bottom edges; and a fastening device for binding the ends of the lids against the ends of the back, and also for securing the leaves in the cover, the said back having straight portions bearing laterally against the fastening device to prevent endwise movements of said back.

2. A book of the character specified, comprising a cover consisting of two independent lids, and a back separate from said lids, said back and lids having their ends loosely overlapping; a series of leaves interposed between said lids; and a fastening-cord passed through recesses in the back and lids and leaves, to bind all of said parts together, the edges of the recesses in the back being elongated and bearing laterally against the fastening-cord.

3 A book of the character specified, comprising a cover composed of two independent lids, each having openings at or near its top and bottom edges and near its inner end, the openings in one lid coinciding with those of the other; leaves interposed between said lids and having openings coinciding with the openings in the lids; a flexible fastening-cord passing through the openings in the leaves and lids; and a flexible back piece separate from the lids and having provisions for engagement with the portions of the cord that pass through the lids and leaves, whereby the back piece is retained in its operative position by said cord, the back piece being adjustable endwise in either direction, to centralize its exposed portion between the lids, the openings in said leaves being open end slots formed to retain the cord when loose.

In witness whereof I have affixed my signature to this specification in the presence of two subscribing witnesses.

FRANKLIN H. GILSON.

Witnesses:
MARCUS B. MAY,
P. W. PEZZETTI.